United States Patent [19]

Diel

[11] Patent Number: 5,431,825

[45] Date of Patent: Jul. 11, 1995

[54] METHOD FOR THE REDUCTION AND STABILIZATION OF METALS

[75] Inventor: Bruce N. Diel, Batavia, Ill.

[73] Assignee: Chemical Waste Management, Inc., Oakbrook, Ill.

[21] Appl. No.: 968,369

[22] Filed: Oct. 29, 1992

[51] Int. Cl.⁶ .............................. C02F 1/62; C02F 1/70
[52] U.S. Cl. ..................... 210/719; 210/720; 210/751; 210/757; 210/901; 210/912; 210/913; 210/914; 405/128; 588/236; 588/256
[58] Field of Search .............. 210/751, 757, 914, 913, 210/915, 719, 720, 912, 911, 901; 75/724, 739, 742; 423/101, 104; 588/236, 256; 405/128

[56] References Cited

U.S. PATENT DOCUMENTS

| | | | |
|---|---|---|---|
| 3,027,321 | 3/1962 | Selm et al. | 210/757 |
| 3,666,447 | 5/1972 | Saubestre | 210/719 |
| 3,841,102 | 10/1974 | Cinner et al. | 210/751 |
| 3,857,704 | 12/1974 | Coulter | 210/719 |
| 3,960,723 | 6/1976 | Butler | 210/720 |
| 3,984,312 | 10/1976 | Dulin et al. | 210/719 |
| 4,026,797 | 5/1977 | Nikolic et al. | 210/719 |
| 4,108,770 | 8/1978 | Roy | 210/757 |
| 4,159,309 | 6/1979 | Faul et al. | 210/757 |
| 4,169,053 | 9/1979 | Sakakibara et al. | 210/719 |
| 4,194,973 | 3/1980 | Smith | 210/50 |
| 4,260,491 | 4/1981 | Cassidy | 210/720 |
| 4,379,082 | 4/1983 | Gauchon | 210/719 |
| 4,405,464 | 9/1983 | Baldwin et al. | 210/719 |
| 4,599,177 | 7/1986 | Hayashi et al. | 210/757 |
| 4,740,244 | 4/1988 | Williams | 210/719 |
| 4,881,973 | 9/1989 | Williams | 210/719 |
| 5,089,141 | 2/1992 | Murphy | 210/757 |
| 5,106,508 | 4/1992 | Schwitzgebel | 210/720 |
| 5,106,510 | 4/1992 | Rieber | 210/912 |
| 5,122,279 | 6/1992 | Guess | 210/757 |
| 5,130,051 | 7/1992 | Falk | 210/751 |
| 5,133,873 | 7/1992 | Catlin et al. | 210/719 |
| 5,200,087 | 4/1993 | Nishihara | 210/757 |
| 5,211,853 | 5/1993 | Jackson et al. | 210/720 |
| 5,285,000 | 2/1994 | Schwitzgebel | 588/256 |
| 5,330,658 | 7/1994 | Grant et al. | 210/719 |

FOREIGN PATENT DOCUMENTS 50-85570  7/1975  Japan ................................ 210/719

OTHER PUBLICATIONS

Nagle, Stanforth, et al., "Treatment of Hazardous Foundry Melting Furnace Dust & Sludges", AFS Transactions, pp. 715–720.

Stephens, Stolzenburg, et al., "Iron Conditioning of Sludge From Foundry Furnace Emission Control Systems for Elimination of EP Toxicity", pp. 511–514.

L. E. Eary & D. Rai, "Chromate Removal from Aqueous Wastes by Reduction with Ferrous Ion", Environ. Sci., Technol., 1988, vol. 22, No. 8, pp. 972–977.

L. E. Eary & D. Rai, "Kinetics of Chromate Reduction by Ferrous Ions Derived from Hematite and Biotite at 25° C.", American Journal of Science, vol. 289, Feb. 1989, pp. 180–213.

Turpin, Stolzenburg, et al. "Methods to Treat EP Toxic Foundry Wastes and Wastewaters", AFS Transactions, pp. 737–740.

Primary Examiner—Cynthia L. Nessler
Attorney, Agent, or Firm—Allegretti & Witcoff, Ltd.

[57] ABSTRACT

A method for reducing reducible metals comprising combining one or more reducible metals with an elemental metal, and then with a reducing agent to form a reduced metal. The mixture may then be stabilized and recovered.

5 Claims, No Drawings

METHOD FOR THE REDUCTION AND STABILIZATION OF METALS

BACKGROUND OF THE INVENTION (1) Field of the Invention

This invention concerns a method for the chemical reduction and stabilization of reducible metals that comprises mixing a reducible metal with one or more elemental metals and a chemical reducing agent to effect the reduction of the reducible metals. A stabilizing agent is then added to the solution to stabilize and in some cases precipitate the reduced metals. The resulting stabilized reduced metals exhibit a very low leaching rates.

(2) Description of the Art

Many methods are known in the prior art for reducing reducible metals. One well known method involves the reduction of reducible metals with a solid metal. This method is inefficient however, requiring the use of metal fines and a well mixed solution. Another metal reducing method involves the combination of a reducible metal with a reducing agent such as iron sulfate powder. The reduction can be accomplished in the solid or liquid phas This method, however, requires a large excess of reducing agent in order to sustain the reducing reaction.

U.S. Pat. No. 4,194,973 discloses a method for decolorizing a solution containing dyes, and specifically chromophoric compounds such as aryl azo- or aryl nito- containing dyes. The method includes combining the dye solution with a source of Fe(II) and iron at metal reduction conditions. The chromophoric compounds disclosed contain Cr(III or VI). Furthermore, the reduced metals are precipitated from the solution and recovered and the resulting decolorized solution is disposed of. The patent discloses that the reducing agent attacks the dye portion of the compound.

A paper, titled "Iron Conditioning of Sludge from Foundry Furnace Emission Control Systems for Elimination of EP Toxicity", W. A. Stephens, et al., Proceedings of the 39th Industrial Waste Conference; Madison, Wis. (1985) pp. 511–14 discloses a study performed by the EPA in which ferric sulfate or iron filings were separately combined with leachable lead and cadmium containing wastes to reduce lead and cadmium leaching rates.

An article by P. D. Turpin, et al.; *Trans. Amer. Foundrymen's Soc.;* 93: 737–40 (1983) describes methods for decreasing lead and cadmium leaching rates of foundry solid waste. The methods include, in the alternative, treating the leachable solid wastes with ferric hydroxide, metallic iron, phosphate, magnesium hydroxide, or lime. The article discusses various methods used to reduce waste leaching rates including absorption, precipitation, chemical reduction, and pH solubility control. The chemical reduction method disclosed is performed using iron filings.

An article by D. C. Nagle, et al., Trans. Amer. Foundrymen's Soc.; 91: 715–20 (1983) discloses a number of methods for treating hazardous wastes generated by foundries. The methods include chemical treatment using sodium phosphate and controlling waste pH to keep the waste metals from solubilizing. The article generally discusses solidification and encapsulation of hazardous wastes in cement.

An article by L. E. Eary, et al.; *Environ. Sci. Technol;* 22:972–77 (1988) discloses the optimum conditions for chromate removal from oxygenated wastes. The method describes reducing Cr(VI) to Cr(III) using ferrous sulfate. Another article by Eary, et al.; *Am. J. Sci.;* 289: 180–213 (1989) discloses that Cr(VI) can be reduced to Cr(III) by combining a chromate solution with ferrous iron.

SUMMARY OF THE INVENTION

It is an object of this invention to provide a method for reducing a reducible metal that exploits the synergism that results from reducing a reducible metal in the presence of both an elemental metal and a reducing agent.

It is another object of this invention to provide a method for reducing a reducible metal that requires only a small amount of a reducing agent.

It is yet another object of this invention to provide a method for reducing a reducible metal that produces a stabilized reduced metal while using a only small amount of stabilizer.

In one embodiment, this invention is a method for stabilizing one or more reducible metals. The method comprises mixing one or more reducible metals with an elemental metal and with a reducing agent to define a reducing mixture. The reducing mixture is allowed to react for a period of time sufficient to reduce at least a portion of the reducible metals to give a reduced mixture that includes one or more reduced metals. Finally, the reduced mixture is recovered and disposed of.

In another embodiment, this invention is a method for stabilizing reducible metals comprising mixing one or more reducible metals with an elemental metal and then with a reducing agent in an aqueous solution to define a reducing solution. The reducing solution is allowed to react for a period of time sufficient to define a reduced solution including one or more reduced metals. The reduced metals are stabilized in a solid by adding a stabilizing agent to the reduced metal solution. The stabilizing agent is allowed to solidify and the solid stabilized reduced metal is recovered for disposal.

DESCRIPTION OF THE CURRENT EMBODIMENT

Chemical treatment to reduce solubility of metals and render a waste non-leachable and therefore non-hazardous is a feasible alternative for handling reducible metal wastes on the basis of regulatory, economic, and technical considerations. This invention recognizes for the first time that a synergism occurs when reducible metals are reduced in the presence of both a metal and a chemical reducing agent.

The treatment of hazardous waste in solid, liquid, or sludge form containing leachable metals such as chromium, cadmium, lead, and thallium is becoming quite important. The EPA has established allowable metal leaching rates and hazardous leachable wastes stabilized in cement or otherwise stabilized must pass EPA regulated leaching tests prior to disposal.

The present invention relates to the use of metal powders, grits, fines, etc. in combination with soluble metal ions for the purpose of effecting the chemical reduction of easily reduced metals such as Cr(VI) to Cr(III), Pb(II) to Pb(0), As V, III) to As(O), Se (VI, IV, II) to Se(0), Hg(II) to Hg(0), Bi(III) to Bi(0), Sb(V, III) to Sb(0), V(V, IV, III, II) to V(0), and Tl(III, I) to Tl(0). The method of this invention is surprisingly more efficient and cost effective than conventional reduction methods that use metallic ion reactants or metal based ionic reducing agents alone.

The process of this invention entails the reduction of a reducible metal by creating a reducing mixture comprising elemental metal, a reducing agent, and one or more reducible metals. The reducing mixture may be in the form of a solid, a liquid, or in the form of a sludge or slurry. It is preferred that the reducing mixture contains water. Therefore, a reducing mixture that is in the form of a solution, a sludge or a slurry is preferred because the reduction reaction occurs quickly and efficiently in an aqueous environment.

The reducible metal reduced by the method of this invention may be selected from any metal ion that is capable of being reduced. Such reducible metals may be supplied to a reducible mixture in pure form or in an admixture with other reducible or non-reducible metals. Generally, the reducible metals reduced by the process of this invention are found in hazardous wastes such as foundry waste, baghouses dust, sludge, incinerator ash, and any other reducible metal containing hazardous waste. The reducible metal of this invention may be selected from a group of reducible metals of iron, chromium, cadmium, lead, thallium, arsenic, selenium, mercury, vanadium, antimony, bismuth, copper, silver and mixtures thereof.

The method of this invention uses a reducing agent. The reducing agent of this invention can be any soluble agent that will lend electrons to a reducible metals. Examples of useful reducing agents include soluble, e.g., chloride, nitrate, sulfate, and acetate salts of Fe(II), (e.g., $FeSO_4.NH_2O$), Mo(II), Ru(II), Cr(II), Mn(II) and V(II).

It is preferred that the reducing agent used in the method of this invention contains ferrous ions and most preferably is ferrous sulfate. Ferrous sulfate generates Fe(II) which acts as a reducing substance. In addition, it has been found that ferrous ions in combination with manganese metal exhibits reducing abilities superior to other metal/reducing agent combinations.

The amount of reducing agent required by the method of this invention will vary depending upon the type of reducible metal that is reduced by the method of this invention. Preferably, an amount of reducing agent in excess of the stoichiometric amount needed to reduce the reducible metal is used.

The method of this invention also requires a metal, a metallic element in non-ionic form. The metal may take on various forms including granules, a powder, or even pieces of metal waste. The maximization of the metal surface area is an important aspect of this invention. Therefore, it is preferred that the metal used is finely divided, that is, in the form of small granules or a powder.

The metal used must be capable of contributing electrons to the reducible metal. Examples of useful metals include iron, tin, chromium, cadmium, lead, arsenic, selenium, thallium, mercury, vanadium, antimony, bismuth, copper, silver, mixtures thereof, and any other metal whose reduction potential is less than iron.

The reduction step of the method of this invention typically occurs at a pH of from about 1 to 12 and preferably from about 3 to 7. The reducing mixture will typically be controlled at a temperature ranging from about 20°-60° C. Under these conditions, the reducing mixture will be converted into a reduced mixture after about 20 minutes to about 10 hours or more.

An important aspect of this invention is the order of addition of the reducing agent and the metal to the reducing solution. It has been discovered that the method of this invention operates more efficiently when the metal is combined with the reducible metal prior to the addition of the reducing agent.

The method of this invention produces a solid or liquid reduced mixture. The reduced mixture may be disposed of by conventional disposal methods including stabilization, land filling, incineration or by any other method known in the art for disposing of such a reduced mixture.

It is preferred that the reduced mixture is stabilized and then land filled. The stabilization of the reduced mixture with a stabilizing agent is an important aspect of this invention. An alkaline stabilizing agent is preferred if the reduced metals are in ionic form. The alkaline nature of the stabilizing agent causes the reduced metals in oxidation states greater than zero to form hydroxide precipitates which exhibit low or no leaching tendencies. If the reduced metals have a zero valence then they will typically plate the metal component of the reduced mixture. The metal is then stabilized to trap the reduced metals. Therefore, the stabilization step of this invention may perform two functions. The stabilizer, if alkaline, may increase the pH of the reduced mixture to above about pH 8 causing precipitatable reduced metals to precipitate from the reduced mixture. Secondly, the alkaline stabilizer will always harden and entomb the reduced mixture allowing it to be disposed of in a conventional land fill.

Examples of stabilizes include cement, especially an alkaline cement such as Portland cement, cement kiln dust, bed ash, rice hull ash, quicklime, lime/fly ash, or any combination thereof. The preferred stabilizing agent is cement. According to this method the stabilizing agent is added to the aqueous reduced mixture, mixed, and allowed to harden into a solid monolithic or granular solid. The solid is then disposed of in a conventional landfill.

The stabilized solid of this invention including a reduced metal will typically exhibit metal leaching rates well below the threshold levels set by the EPA. The EPA leaching thresholds are determined by the toxicity characteristic leaching procedure (TCLP) established by the Environmental Protection Agency. The EPA TCLP is found in the Federal Register 55(61), 11798 (Mar. 29, 1990).

The invention may be better understood by referring to the following examples.

EXAMPLE

The following examples are offered to illustrate the method of the invention. The effectiveness of each test was determined using the Toxicity Characteristic Leaching Procedure (TCLP), as promulgated by the Environmental Protection Agency (EPA) and described in the Federal Register 55 (61), 11798 (Mar. 29, 1990). The steel fines referred to in the Examples have a particle size distribution as indicated in Table I below. The ferrous sulfate used ($FeSO_4.7H_2O$) are commercially available, technical grade, reagents. Manganese (powder, −325 mesh), and $MnSO_4.H_2O$ (98+%) are commercially available reagents.

TABLE 1

| Sieve Size (mm) | Mass Fraction |
| --- | --- |
| 0.500–0.106 | 0.609 |

TABLE 1-continued

| Sieve Size (mm) | Mass Fraction |
| --- | --- |
| 0.106–0.032 | 0.383 |
| 0.032–0.025 | 0.007 |

EXAMPLE I

The waste treated in this example was a composite of five different samples (100 g each) of hazardous waste incinerator ash. The composite was ball-milled overnight to yield a homogeneous solid of particle size <0.5 mm. The total constituent concentrations in the waste (CCW) were determined and are tabulated below.

| Constituent Concentration in the Waste (mg/kg) | | | | | | | |
| --- | --- | --- | --- | --- | --- | --- | --- |
| Ag | As | Ba | Cd | Cr | Hg | Pb | Se |
| 30.7 | 21.4 | 780 | 43.2 | 178.5 | 8.77 | 1520 | 0.36 |

Portions of the waste, 50.0 g each, were slurried first with $H_2O$ (12.5 ml) and then combined with agent(s) and mixed well until the mixture was visibly homogeneous. The mixture was then solidified by addition of 12.5 g of normal Portland cement (ASTM Type 1). The solidified product was sampled for analysis by TCLP to quantify leachable chromium. The results are shown in Table 2.

TABLE 2

Cr-Leaching Results; Incinerator Ash (EPA Treatment Standard = 0.073 ppm)

| SAMPLE # | Mix Ratio (M.R.)* | | | [Cr] (ppm) |
| --- | --- | --- | --- | --- |
| | Steel Fines | $FeSO_4$ | $Fe/FeSO_4$ (1:1) | |
| Raw Waste | 0 | 0 | 0 | 0.44 |
| 1 | 0.1 | 0 | 0 | 0.24 |
| 2 | 0 | 0.1 | 0 | 0.1 |
| 3 | 0 | 0 | 0.05 | <0.02 |

*M.R. = [Wt. of Reagent/Wt. of Waste]

The synergist effect is evidenced by comparison of Sample 3 (2.5% by weight, of both steel fines and $FeSO_4 \cdot 7H_2O$) with Samples 1, 2 where the reducing agents are added singly. The synergistic mixture exhibited a leaching rate five times lower than using $FeSO_4$ alone and over ten times lower than when iron was used alone.

EXAMPLE II

A drummed solid process waste resulting from battery manufacturing, and containing Cr as chromate salts and ignitable lithium (Li) metal was treated in this example to (1) remove the hazard of reactivity (ignitability), and (2) reduce leachable chromium (as per EPA TCLP, treatment standard=5.0 ppm).

The solid waste (200.0 g) was hydrolyzed carefully with 50.0 ml $H_2O$ under an inert $N_2$ atmosphere. Upon completion of hydrolysis, all subsequent operations were conducted in air with no other special precautions. Various amounts (see Table 3) of steel fines were added the hydrolysis product slurry and mixed well until visibly homogeneous. Ferrous sulfate was then added, mixed well, and the entire mixture allowed to sit for approximately 30 minutes. Finally, the mixture was solidified with Portland cement (40%, w/w). The solidified product was analyzed by TCLP for quantitaion of leachable chromium. The results of the experiments are shown in Table 3 below.

TABLE 3

Cr-Leaching Results; Chromate Waste (EPA Treatment Standard - 5.0 ppm)

| SAMPLE # | Mix Ratio (M.R.) | | [Cr] (ppm) |
| --- | --- | --- | --- |
| | Fe | $FeSO_4$ | |
| Raw Waste | 0 | 0 | 11,700 |
| 1 | 0.36 | 0 | 1650 |
| 2 | 0 | 5.3 | 348 |
| 3 | 0.5 | 0.4 | <0.01 |
| 4 | 0.2 | 0.1 | 0.42 |

For this particular sample it was found that the order of addition of the reducing agents was critical. Steel fines are preferably added prior to the ferrous sulfate. Addition of the ferrous sulfate before the steel fines, in Example 4 yielded a product which exhibited a Cr-leaching rate much higher than Sample 3 where steel fines were added before the ferrous sulfate.

EXAMPLE III

To determine the efficacy of various metals and/or metal salts in the process, a second sample of the waste described in Example 2 was treated. In this sample, however, there was no lithium metal. The waste was first slurried with water (30%, w/w), with the metal, and then with the soluble metal salt reducing agent. After sitting for approximately 30 minutes the mixture was solidified with Portland cement (40%, w/w). The solidified product was sampled for analysis by TCLP and quantitation of leachable chromium. Exemplary results are shown in Table 4 below.

TABLE 4

| Sample No. | Mix Ratio | | | | [Cr] (ppm) |
| --- | --- | --- | --- | --- | --- |
| | Steel Fines | Mn | $FeSO_4$ | $MnSO_4$ | |
| 1 | 0.2 | — | 0.5 | — | 0.94 |
| 2 | — | 0.2 | 0.5 | — | 0.06 |
| 3 | — | 0.2 | — | 0.5 | 48.1 |

These results illustrate the superior reducing power of the soluble ferrous ion, Fe(II), in combination with manganese metal.

EXAMPLE IV

This example illustrates the ability of the process of this invention to stabilize lead (Pb). The waste sample consisted of ashes/refuse resulting from a warehouse fire in which commercial lead stearate was combusted. The waste was slurried first with water. Steel fines were then added and mixed thoroughly followed by the addition and mixing of ferrous sulfate. The mixture was allowed to sit for approximately 30 minutes, followed by solidification with Portland cement. The solidified product was sampled for analysis by TCLP and quantitaion of leachable lead. The results are shown in Table 5.

TABLE 5

Pb-Leaching Results; Pb-Contaminated Ash (Treatment Standard = 5.0 ppm)

| Waste (g) | $H_2O$ (g) | Steel Fines (g) | $FeSO_4 \cdot 7H_2O$ (g) | Cement (g) | [Pb] (ppm) |
| --- | --- | --- | --- | --- | --- |
| Raw Waste | — | — | — | — | 730 |
| 200 | 35 | 40 | 100 | 60 | 1.30 |
| 200 | 35 | 80 | 100 | 60 | 1.06 |
| 200 | 35 | 80 | 50 | 60 | 0.79 |
| 200 | 35 | 40 | 50 | 60 | 0.83 |

All of the samples treated by the method of this invention exceeded the TCLP standard.

EXAMPLE V

A second example of Pb-treatment involves stabilization of a highly contaminated (51,000 ppm total Pb, 571 ppm leachable by TCLP) lagoon sludge. To the wet sludge (40% solids) were added steel fines, followed by ferrous sulfate. The mixture was allowed to sit for approximately 30 minutes after which it was solidified by the addition of rice hull ash, quicklime (CaO), Portland cement, or bed ash. The solidified product was sampled for analysis by TCLP and quantitation of leachable lead. Exemplary results are shown in Table 6.

TABLE 6

Pb-Leaching Results; Lagoon Sludge (Treatment Standard = 5.00 ppm)

| MIX RATIO | | | | | | TCLP |
|---|---|---|---|---|---|---|
| Steel Fines | $FeSO_4 \cdot 7H_2O$ | Rice Hull Ash | Quicklime | Portland cement | Bed Ash | Pb (ppm) |
| 0.4 | 0.2 | 0.2 | 0.1 | — | — | 0.24 |
| 0.3 | 0.2 | 0.2 | 0.1 | — | — | 0.27 |
| 0.4 | 0.2 | 0.2 | — | 0.1 | — | 0.30 |
| 0.3 | 0.2 | 0.2 | — | 0.1 | — | 0.36 |
| 0.25 | 0.2 | 0.2 | 0.1 | — | — | 0.32 |
| 0.40 | 0.2 | — | — | — | 0.9 | 2.10 |
| 0.40 | — | — | — | — | 1.0 | 17.43 |
| 0.80 | — | — | — | — | 1.0 | 4.83 |

Here again, the final three entries in Table 6 illustrate the lack of synergism as evidenced by performance in the TCLP test when both the steel fines and $FeSO_4$ are employed versus steel fines alone.

EXAMPLE VI

This example of Pb-stabilization involves the treatment of a highly contaminated (255,000 ppm total Pb, 3220 leachable by TCLP) baghouse dust. The waste was slurried first with water, the steel fines added and dispersed well, followed by addition of the ferrous sulfate. The mixture was allowed to sit for approximately 30 minutes after which it was solidified by addition of Portland cement. The solidified product was sampled for analysis by TCLP and quantitation of leachable lead. Exemplary results are shown in Table 7.

TABLE 7

Pb-Leaching; Baghouse Dust (Treatment Standard = 5.00 ppm)

| WASTE (g) | Fe (g) | $FeSO_4 \cdot H_2O$ (g) | Cement (g) | $H_2O$ (mL) | [Pb] (ppm) |
|---|---|---|---|---|---|
| 100.0 | 20.0 | 10.0 | 20.0 | 30.0 | 3.26 |
| 100.0 | 40.0 | — | 20.0 | 25.0 | 39.40 |
| 100.0 | 20.0 | 20.0 | 40.0 | 30.0 | 2.70 |
| 100.0 | 30.0 | 30.0 | 40.0 | 30.0 | 4.64 |
| 100.0 | 40.0 | 20.0 | 40.0 | 30.0 | 0.53 |
| 100.0 | 100.0 | 50.0 | 50.0 | 70.0 | 0.65 |

Entry 2 in Table 7 again illustrates the lack of synergism as evidenced by the unacceptable lead leaching rate.

The description above has been offered for illustrative purposes only, and it is not intended to limit the scope of the invention of this application which is defined in the following claims.

What I claim is:

1. A method for stabilizing a reducible metal consisting of:
   a. mixing one or more reducible metals with manganese in non-ionic form and with ferrous sulfate to define a reducing mixture;
   b. allowing the reducing mixture to react for a period of time sufficient to reduce at least a portion of the reducible metals to give a reduced mixture including one or more reduced metals wherein said reduction takes place at a pH from about 1 to about 12 and at a temperature from about 20° C. to about 60° C.;
   c. recovering the reduced mixture; and
   d. disposing of the recovered reduced mixture of step (c) by admixing the recovered reduced mixture with a stabilizing agent to define a stabilized mixture, allowing the stabilized mixture to solidify into a solidified stabilized mixture, and disposing the solidified stabilized mixture.

2. The method of claim 1 wherein the stabilizing agent is selected from the group of compounds including cement, kiln dust, lime/fly ash, quicklime, lime kiln dust, bed ash, rice hull ash, or mixtures thereof.

3. A method for stabilizing a reducible metal consisting of:
   a. mixing one or more reducible metals with manganese in non-ionic form and with ferrous sulfate to define a reducing mixture;
   b. allowing the reducing mixture to react for a period of time sufficient to reduce at least a portion of the reducible metals to give a reduced mixture including one or more reduced metals wherein said reduction takes place at a pH from about 1 to about 12 and at a temperature from about 20° C. to about 60° C.; and
   c. recovering the reduced mixture.

4. The method of claim 3 wherein the reducing mixture is an aqueous reducing mixture.

5. The method of 3 wherein the manganese is admixed with the reducible metal before adding the ferrous sulfate.

* * * * *